United States Patent Office 3,123,588
Patented Mar. 3, 1964

3,123,588
COLOR STABLE ACRYLONITRILE POLYMERS
Thomas W. Lunney, Camden, S.C., assignor to E. I. du Pont de Nemours and Company, Wilmington, Del., a corporation of Delaware
No Drawing. Filed Aug. 29, 1958, Ser. No. 757,915
4 Claims. (Cl. 260—79.3)

This invention relates to acrylonitrile polymers and more specifically to the production of such polymers and shaped structures therefrom such as fibers, films, and the like with improved whiteness and color stability.

Among the products of vinyl polymerization, the polymers of acrylonitrile have proven themselves uniquely suited for the production of textile fibers. Fabrics of particularly desirable tactile qualities have been made from such fibers. The fibers have shown a range of physical properties which has led to good processability on standard textile processing equipment. Fibers that are dyeable by most different classes of dyes have been prepared by suitable adjustments in polymer composition.

Throughout the changes that have been made in acrylic polymers and fibers from these polymers, one problem has always been present. This problem has been the development of discoloration in the polymer during preparation and more importantly in the polymer during its dissolution and processing into fibrous form. This problem of color development has been attacked over the years by bleaching of fibers, by addition of various chemicals to the polymer during the time of preparation of solutions for spinning, and by changes to the process of polymerization. The bleaching methods which have produced fibers of the desired whiteness have been deficient in that the products obtained have not been color stable against the effects of ultra-violet irradiation. The use of additives has generally not allowed a sufficient degree of color reduction, and many of the materials have shown undesirable side effects such as increased corrosion of the equipment used to process the solutions.

The most desirable method for improving polymer color has been that of alteration of polymerization conditions. Particularly white fibers have been prepared by the inventions of Anthes, S.N. 597,322, now abandoned, and S.N. 597,323, now abandoned. For some end uses, however, it has been desirable to produce polymers of still further reduced color.

It is therefore an object of this invention to provide acrylonitrile polymers of improved whiteness and whiteness retention. It is a further object to provide a process for the preparation of polymers of improved whiteness and whiteness retention. Other objects will appear hereinafter.

These objects are accomplished by preparing polymer containing a limited and controlled number of groups of the types —$SO_3H$ and —$OSO_3H$.

Acrylonitrile homopolymer and useful copolymers may be prepared by the use of the initiator system composed of a persulfate salt, such as potassium persulfate and a bisulfite salt, such as sodium metabisulfite. This initiator system produces polymer molecules containing end groups of the type —$SO_3M$ and —$OSO_3M$ where M may be hydrogen or any monovalent cation, such as sodium, potassium, etc. The nature of the group M will depend upon the conditions of polymerization and polymer after-treatment.

Thus, a polymerization carried according to the teachings of Richards, U.S. 2,628,223, at a pH between 2.5 and 3.5 will produce polymer in which the group M will be largely hydrogen. That is, many of the sulfur-containing end groups which result from the initiator system will be of the form —$SO_3H$ and —$OSO_3H$. If, however, the polymerization is stopped by treatment with basic materials as in Richards, U.S. 2,546,238, the group M will be the cation of the basic material used; thus, stopping the polymerization with sodium hydroxide, sodium carbonate, or sodium bicarbonate results in the production of polymer having end groups of the form —$SO_3Na$ or —$OSO_3Na$.

Polymer containing —$SO_3M$ groups will also be made by copolymerizing acrylonitrile with sulfonate-containing monomers, for example, as taught in Andress and Sweeny, U.S. 2,837,500 or Millhiser, U.S. 2,837,501. These patents teach the use of aromatic sulfonate monomers, such as potassium styrene sulfonate, but aliphatic monomers such as ethylene sulfonic acid may also be used. Whether the monomer is in the form of its free acid or in the form of a salt does not determine the form of the sulfonate groups in the polymer. This depends on the conditions of polymerization and after-treatment as described above for polymer end groups. Of course, polymer may contain —$SO_3M$ groups introduced by the use of special co-monomers regardless of whether or not the initiation of polymerization introduces similar groups.

When polymerization is carried out at a low pH and the polymerization medium is then made strongly alkaline, polymer of relatively good color may be obtained providing that other polymerization conditions such as the ratio of bisulfite activator to persulfate catalyst are properly chosen. The color level may be improved however by carefully chosen alternate short-stopping procedures as will be described shortly.

Short-stopping of the polymerization may be brought about by other means which operate at low pH. No neutralization of —$SO_3H$ or —$OSO_3H$ groups occurs when this is done. Polymer so produced exhibits good color when in the form of solutions prepared in glass equipment. However, glass equipment is of limited usefulness in the production of textile fibers. When polymers prepared and short-stopped under acid conditions are dissolved and processed in metal equipment, as is customary in the preparation of fibers, they cause corrosion of that equipment. Discoloration may result, at times to an extent which makes the product darker than polymers prepared with alkaline short-stopping.

It is indeed surprising that polymer prepared with the use of short-stopping at a low pH followed by after-treatment with a controlled amount of basic material is superior to polymer short-stopped entirely by base or to polymer short-stopped only in acid condition, with regard to color development under conditions normally encountered in the production of fibers. The superior polymer is one containing a limited number of —$SO_3H$ and —$OSO_3H$ groups. The polymer should contain substantially no ionic groups other than those containing —$SO_3^-$ and —$OSO_3^-$ and all of these ions except the limited number already referred to should be neutralized with ions other than hydrogen; as for example, sodium, potassium, etc. The polymers should contain between about 0.01 and about 3.0 milliequivalents per kilogram of —SO₃H and —OSO₃H groups and preferably should contain between 0.5 and 1.5 milliequivalents per kilogram of these groups for optimum color.

The invention will be more easily understood on the basis of the following examples, which are meant to be illustrative but not limitative. In these examples, parts and percentages are by weight unless otherwise specified.

*Example I*

To a well agitated cylindrical vessel the following ingredients were added at the rates given.

| | Parts/hr. |
|---|---|
| Acrylonitrile | 263 |
| Methyl acrylate | 17 |
| Sodium styrene sulfonate | 1.0 |
| Sodium metabisulfite | 11.2 |
| Potassium persulfate | 0.7 |
| Water | 708 |

The vessel was equipped with an overflow pipe from which the slurry of polymerized material overflowed. This pipe was at such height from the bottom of the vessel that the ingredients fed to the vessel had an average residence time of 87 minutes. The space in the vessel above the liquid level was kept filled with Kemp gas, an inert gas mixture consisting essentially of nitrogen and carbon dioxide. The ionic ingredients listed above were added to the reactor dissolved in part of the water. Each of these was added as a separate feed stream. The liquid monomers were added as a separate stream, as was the remainder of the water. Sulfur dioxide gas was bubbled into the reactor at a rate to maintain the pH of the reaction mixture at 3.1. The reactor was jacketed and steam and chilled water were passed into the jacket at such rates to maintain the reactor contents at a temperature of 55° C.

The overflow from the reactor which contained a sufficient amount of polymer to show that the conversion had been 74% was continuously fed into a smaller stirred vessel to which were continuously added 13.5 parts/hr. of 1% aqueous ethylene diamine tetracetic acid and 67 parts/hr. of 2% aqueous paramethoxyphenol. The polymer from the resulting mixture was continuously filtered off and washed with water. The wet filter cake was continuously fed into still another stirred vessel to which were added 3,000 parts/hr. of fresh water and sufficient sodium carbonate to maintain the pH of the mixture at 9.5. The polymer present in this slurry was continuously filtered off and washed with water. It was then dried.

The total content of —SO₃M and —OSO₃M groups was determined as follows. A solution of 1% polymer in dimethylformamide was prepared. This solution was passed through an ion exchange column containing a dehydrated mixture of strongly acidic and strongly basic ion exchange resins where the cationic exchange resin was 100% in the free acid form, and the anionic exchange resin was 100% in the basic hydroxyl form. Dehydration of the resin was effected by washing with acetone followed by displacement with dimethylformamide. One suitable mixed resin bed was Rohm & Haas Amberlite, MB-3. The flow rate of polymer solution through the resin was such that it was in contact with the resin for at least three minutes. The solution was next passed through a column containing a strongly acidic resin of the sulfonate type, such as Rohm & Haas I.R. 120, 100% in the free acid form where contact time was again not less than three minutes. These steps removed any ionizable impurities in the solution and effected complete conversion of the ionizable acidic sites to the corresponding free acids. Aliquots of the effluent dimethylformamide solution were taken for determination of polymer content and for determination of polymer acidity present in the solution. The titration of free polymer acidity was made directly in the dimethylformamide medium to a visual indicator or potentiometric end point with a standard absolute methanol solution of a strong base such as 0.005 N potassium hydroxide.

The visual indicator used as a mixed indicator neutral red-xylene cyanol FF. With this indicator the free acids of alkyl sulfates, alkyl sulfonates, and aryl sulfonates are titrated while weak acids, such as carboxylic acids, if present are not. The amount of potassium hydroxide used to titrate the one aliquot and the amount of polymer found in the other aliquot were used to calculate the total acidity of the polymer. This value was calculated as milliequivalents of acidity per kilogram of polymer. For the polymer sample of this example, the value found was 57 milliequivalents per kilogram.

To determine the free acidity of the polymer, that is, the content of groups in the form —SO₃H or —OSO₃H, a weighed sample of polymer was dissolved in 100 ml. of deionized dimethylformamide in a wide mouth bottle. Solution was accomplished by shaking for 15 to 20 minutes. After the addition of 2 ml. of 0.01 N methanolic hydrochloric acid, the mixture was stirred to redissolve precipitated polymer and was then titrated with 0.008 N methanolic potassium hydroxide to the end point of the mixed indicator described in the previous paragraph. Free acidity was calculated as milliequivalents per kilogram of polymer and the polymer produced in this example was found to have a free acidity of 0.28 milliequivanet per kilogram.

The polymer color was determined by preparing a 5.8% solution of the polymer in pure dimethylformamide and measuring the optical density of this solution at 400 millimicrons against a sample of pure solvent using a Beckman Model Du spectrophotometer. The color value ("CV") of the polymer was taken as 100 times the optical density. For the polymer of this example, the CV was 9.9.

The polymer of this example was converted to fiber by dry spinning from dimethylformamide solution followed by extraction and drawing in hot water, the draw ratio being 4×. After drying at 127° C. for 4 minutes, the fiber was measured for fiber color value ("FCV") as follows. The fiber was cut to 2.5-inch lengths and the cut material was scoured at the boil for 30 minutes in deionized water containing 0.1% of a non-ionic surface active agent. The sample was then rinsed twice in deionized water, squeezed, and centrifuged to remove any excess after which it was allowed to dry in air at room temperature. A two-gram portion fo this dry sample was carded to parallelize the fibers by means of a hand card to give a pad of staple fibers about 3 by 6 inches, which was folded once lengthwise. The reflectance ratios of the sample in the "green" and "blue" filter settings of the instrument were measured using a Model IV Colormaster Differential Colorimeter made by Manufacturers Engineering & Equipment Company of Hatboro, Pennsylvania, calibrated against the manufacturer's standard reflectance plates and National Bureau of Standards certified reflectance plates. Two readings were taken on each side of the sample, the second measurement being made with the sample rotated 90° from the position of the first reading. Fiber color values were then calculated from the average of the four readings, using the following formula:

$$FCV = \frac{R.R.\ green - R.R.\ blue}{R.R.\ green} \times 100$$

where R.R. green stands for reflectance ratio with the green filter, and R.R. blue stands for reflectance ratio with the blue filter. The fiber of this example showed FCV=5.0.

*Example II*

The polymerization was carried out under identical conditions to those of Example I up to the point of overflow of the polymer slurry from the reaction vessel. In the present example, the stirred vessel into which the polymer slurry overflowed was not fed with ethylene diamine tetraacetic acid or paramethoxyphenol but rather was fed with a sufficient amount of sodium carbonate solution to maintain the contents of this vessel at a pH of 9.5. About ten times as much carbonate was required as in the corresponding step in Example I. This will be recognized as short-stopping according to the teachings of the prior art. Polymer from the slurry in this second vessel was continuously filtered as before, but the wet filter cake was slurried with plain water rather than with the sodium carbonate of Example I. When filtered from the last slurrying operation, washed and dried, the polymer was found to have the following properties as measured according to the methods of Example I.

| Polymer Total Acidity | Polymer Free Acidity | CV |
|---|---|---|
| 57 milliequiv./kg | −0.43 milliequiv./kg. (polymer slightly basic). | 12.5 |

The polymer was converted to fiber according to the method of Example I. The fiber color value was found to be 6.4.

When the results of Examples I and II are compared, it is apparent that the process of Example I produces a polymer which is slightly acidic in nature, and that this polymer shows improved color in dilute solutions in dimethylformamide and that it produces fiber of improved color when processed according to standard procedures.

*Example III*

Example I was repeated except that sodium styrene sulfonate was absent from the feed to the reactor. In accord with its absence the polymer produced was found to have a total acidity of 30 milliequiv./kg. The free acidity of the polymer was 0.5 millequiv./kg. The polymer was found to have a CV of 9.8 and fiber produced from it, in accord with Example I, was found to have an FCV of 5.1.

Polymerization of acrylonitrile with other neutral comonomers using potassium persulfate and sodium metabisulfite as initiator system, and using the same short-stop procedures resulted in the production of polymer with the same low color level.

*Example IV*

A continuous polymerization was carried out with the following feed rates to the reactor after the establishment of steady state conditions.

|  | Parts per hr. |
|---|---|
| Acrylonitrile | 132 |
| Methyl acrylate | 8.1 |
| Sodium styrenesulfonate | 0.4 |
| Sodium metabisulfite | 5.5 |
| Potassium persulfate | 0.4 |
| Sulfur dioxide | 0.57 |
| Water | 359 |

The temperature of the reacting mass was maintained at 55° and its pH remained constant at 3.0.

The reactor was of such size that the average residence time of ingredients in the reactor was 88 minutes. The space above the liquid in the reactor was kept filled with inert gas. The overflow from the reactor was treated in a second stirred vessel with 13 parts per hour of a 1% aqueous solution of ethylene diamine tetraacetic acid and a sufficient amount of 10% sodium carbonate solution to maintain the pH in this vessel at 3.8. The liquid from this second vessel was continuously pumped to a continuous filter which removed the polymer from the slurry. This polymer was well washed with water and was then dried in an oven at 115° C. for 25 minutes. The resulting dried product had an intrinsic viscosity of 1.5, as measured in dimethylformamide solution and had a total acidity of 57 milliequivalents per kilogram, a free acidity of 0.61 milliequivalent per kilogram and a CV of 8.3, all measured according to the procedures described earlier.

When the polymer was converted to fiber under conditions in accord with those used in Example I, the final product showed a FCV of 4.0. When the polymer was spun only about one-seventh as many breaks per pound occurred as while processing the polymer of Example II. In a series of similar experiments, it was found that fibers of good color could be obtained when the free acidity of the polymer was between 0.01 milliequivalent per kilogram and 3.0 milliequivalents per kilogram. Particularly good color was obtained when the polymer samples were in the range 0.5–1.5 milliequivalents per kilogram in free acidity.

Variations in free acidity can be controlled in the process of this example by variation in the amount of sodium carbonate or other alkali metal carbonate added to the overflow from the polymerizer. It was found that the process could be readily adjusted by a control chart procedure whereby changes in free acidity as a function of time were corrected by changes in the rate of carbonate feed.

*Example V*

Another continuous polymerization was carried out as in Example IV in which the feed rates to the reactor after the establishment of steady state conditions were as follows:

|  | Parts per hr. |
|---|---|
| Acrylonitrile | 132 |
| Methyl acrylate | 8.1 |
| Sodium styrenesulfonate | 0.4 |
| Sodium metabisulfite | 5.5 |
| Potassium persulfate | 0.4 |
| Sulfur dioxide | 0.57 |
| Water | 359 |

The temperature of the reaction mass was maintained at about 55° C. and its pH remained constant at 3.0. The reactor was of such a size that the average residence time of ingredients in the reactor was about 88 minutes. The space above the liquid in the reactor was kept filled with an inert gas. The overflow from the reactor was treated in a second vessel which was constantly stirred while adding a sufficient amount of 10% sodium carbonate solution to maintain the pH in this vessel between 3.5 and 4.0. The polymer in this second vessel was cooled to 30° C. The polymer was washed thoroughly with water and dried in an oven at 115° C. for about 25 minutes. The dried product had an intrinsic viscosity of about 1.5 as measured in dimethylformamide solution and had a total acidity of 57 milliequivalents per kilogram. The free acidity was from about 1.0 to 1.5. The polymer had a color value of from 8.9–9.2 and an FCV of 5.1–5.2 when converted to fiber under the conditions of Example I.

*Example VI*

To a solution of 0.342 part of potassium dihydrogen phosphate in 190 parts of distilled water of pH of 7.0 was added 13 parts of acrylonitrile, 0.13 part of sodium methallyl sulfonate, 0.1888 part of thiourea, and 5.68 parts of 3% hydrogen peroxide. The reaction mixture was flushed with nitrogen and the reaction bottle sealed. After standing, with occasional shaking at room temperature for three hours, the reaction mixture was filtered and the copolymer was washed with distilled water. The polymer was then slurried with 80 parts of sodium carbonate solution of pH 8.5. After 15 minutes in this medium, it was again filtered off and washed with distilled water. Approximately ½ of the wet polymer was re-slurried in 50 parts of 0.0005 N sulfuric acid. After 15 minutes in this medium, the polymer was again filtered and washed with distilled water as before. Both of the polymer samples were then dried at 60° C. overnight. The total weight of dry polymer obtained was 8.0 parts. Each sample showed an intrinsic viscosity of 1.25 and a total acidity of 31 milliequiv./kg. The sample which was filtered from carbonate solution and washed before drying was found to have a free acidity of −0.49 milliequiv./kg. (basic) while the polymer, which had been given the additional treatment with sulfuric acid, had a free acidity of 0.87 milliequiv./kg. When the two samples were separately dissolved in pure dimethylformamide to form 5% solutions, the polymer which had been given the additional sulfuric acid treatment was found to be visually whiter than the other.

*Example VII*

The polymerization of Example I was repeated using the same flow rates of all ingredients and the same pH and temperature. In the present example, however, the overflow from the reactor was treated in the second stirred vessel with 67 parts/hr. of a 2% solution of paramethoxyphenol. No ethylene diamine tetracetic acid was added. The polymer was continuously filtered, washed, and retreated with sodium carbonate solution as in Example I. The analytical data obtained on this polymer were in accord with those of the polymer of Example I, and the polymer showed the same good color of the earlier sample.

As described earlier, this invention is applicable to acrylonitrile polymers containing no ionizable groups except the —$SO_3M$ and —$OSO_3M$ groups. The total number of these groups may vary over a wide range. These groups may be present on the polymer as a result of the initiator system used, or the —$SO_3M$ group may be added in the form of vinyl monomers which contain it. The amount of acrylonitrile in the polymer should be at least 85%. The amount of monomer containing the desired —$SO_3M$ group which is used may vary according to the uses to which the polymer is to be put. At times it will be desired to use as much as 5% or more of such monomer. The important feature of the invention is that the polymer is so treated that each kilogram of polymer will contain between about 0.01 milliequiv./kg. and about 3.0 milliequiv./kg. of these groups in the form —$SO_3H$ and —$OSO_3H$ and that the remainder of these groups will be neutralized with cations such as sodium, potassium, etc. The preferred range for the content of groups in the acid form is 0.5–1.5 milliequiv./kg.

The preferred initiator system for the polymerization consists of a salt of peroxydisulfuric acid, such as potassium persulfate and a sulfoxy reducing agent, such as sodium metabisulfite or sulfur dioxide. Particularly advantageous results are obtained with potassium persulfate and sodium metabisulfite in a ratio of no more than 1 to 8. Other initiator systems may be used provided that they do not introduce ionic end groups into the polymer other than the ionic groups specified in the previous paragraph.

Both continuous processes and batch processes of polymerization may be used. The continuous process is preferred for convenience. The processes which convert the original polymerization product to a condition in which the desired content of ionic groups are in the free acid form may all be carried out in a continuous manner.

Any vinyl monomer containing a sulfonic acid group or a sulfonate salt group may be utilized in the polymerization. Among those which may be used to advantage are sodium styrene sulfonate, sodium methallyl sulfonate, sodium allyl sulfonate, the corresponding potassium salts of these monomers, ethylene sulfonic acid, and the salts of ethylene sulfonic acid. Neutral monomers may also be added during the polymerization. These include the lower alkyl esters of acrylic and methacrylic acids, acrylamide, styrene, vinyl chloride, vinylidene chloride, vinyl acetate, methyl vinyl ketone, and other vinyl monomers free of ionic groups which are commonly used in vinyl polymerizations.

A number of treatments may be used to convert the polymer to the form in which the desired content of acidic end groups is in the free acid form. If the polymer is prepared in acidic medium, one of the simplest treatments consists of treating the entire polymerization product with a shortstopping agent active in acidic medium and with a sufficient quantity of basic material to convert the desired number of acid groups attached to the polymer to their neutralized form. In one embodiment of the invention, the reaction mass may be cooled to 30° C. or less and a controlled amount of base added to give the desired free acidity. This generally occurs at a pH of about 3.5 to 4.0.

The amount of basic material should be carefully controlled so that the required number of acidic groups remain acidic. Basic materials which may be added include sodium carbonate, sodium bicarbonate, sodium hydroxide, potassium carbonate, potassium bicarbonate and potassium hydroxide. The amount to be added will depend on the polymerization conditions including the pH of the polymerization medium, the rate of polymer production and the nature of the basic material added. It is a matter of simple adjustment to determine the amount of each base to be added to produce polymer having the desirable free acidity characteristics.

Among the shortstopping materials effective in acid medium which may be used are ethylene diamine tetraacetic acid, salts of this acid, such as calcium disodium ethylene diamine tetraacetic acid, and paramethoxyphenol. When these are used in conjunction with basic material, as described in the previous paragraph, the amount of base will also depend on which of these materials is added. It is also possible to treat the polymer first with one of these shortstopping agents and to treat it with the controlled amount of base in the later operation.

Yet another proces for bringing the polymer to the desired condition consists in treating the polymerization product with sufficient basic material, such as sodium carbonate, to convert al of the —$SO_3H$ and —$OSO_3H$ groups to their neutralized form; after which the polymer is treated with a sufficient amount of acid to bring the desired number of —$SO_3M$ and —$OSO_3M$ groups into the —$SO_3H$ and —$OSO_3H$ form. Both inorganic acids, such as sulfuric acid, sulfurous acid, and organic acids, such as oxalic acid, are useful in this regard.

The various treatments are applied to the polymer before it is dried. Once the polymer is in the condition having the required content of free acid groups, it may be washed with pure water, dried, blended, ground, and otherwise treated and handled as may be required preparatory to conversion to fiber or other shaped articles.

The polymers of this invention are useful in any of the normal applications for polymers of acrylonitrile. Their advantage over prior art polymers lies in the improvement in the color of the final article which is realized. The polymers may be used for the preparation of films, by any of the usual casting means. Of greatest importance is the use of these polymers to prepare fibers. Manufacture of fibers from acrylic polymers is generally carried out by dissolving the polymer in a solvent and extruding through a spinneret into a coagulating medium such as a hot gas or a liquid coagulant. Among the solvents most commonly used is dimethyl formamide, although other common solvents are equally applicable. The temperatures required to dissolve the polymer and to spin the resulting solution cause some discoloration from the level present in the original polymer, and it is desirable to prepare the final fiber in the whitest possible form. The polymers of this invention are inherently whiter than those of the prior art and they maintain their color improvement through the necessary processing operations during fiber production.

The improved whiteness of the final fibers allows the preparation of woven goods, knit goods, pile fabrics, and other articles of commerce of superior whiteness when used in their undyed form and of purer color when used in dyed form. This latter is particularly apparent when the fabric sare of pastel shades. The dyeing may, of course, be carried out on the fibers themselves, on the yarns produced from them, or on the fabrics or ultimate garments. In any case, any yellowness present in the fiber itself will alter the shade produced by application of dye, and the clearest, brightest colors are obtained when the fiber shows the least amount of original color.

It will be apparent that many widely different embodiments of this invention may be made without departing from the spirit and scope thereof and therefore it is not intended to be limited except as indicated in the appended claims.

I claim:

1. A white linear polymer of monomeric material containing at least 85% acrylonitrile having attached to the polymer ionizable groups consisting of —$SO_3M$ and —$OSO_3M$ in which M represents elements from the group consisting of H and the alkali metals; said ionizable groups being present on said polymer in an amount equal to at least about 30 milliequivalents per kilogram of polymer and from .01 to 3 milliequivalents per kilogram of polymer of the said ionizable groups being —$OSO_3H$ and —$SO_3H$.

2. The polymer of claim 1 in which the said milliequivalents per kilogram of polymer of —$OSO_3H$ and —$SO_3H$ groups are from 0.5 to 1.5.

3. The polymer of claim 1 in which the polymer is a copolymer comprising at least 85% acrylonitrile and up to 5% of an alkali metal styrene sulfonate.

4. The product of claim 1 in which the polymer is a homopolymer of acrylonitrile which contains no ionizable groups other than the said —$SO_3M$ and —$OSO_3M$, and the said groups are attached to the ends of the polymer chain.

References Cited in the file of this patent

UNITED STATES PATENTS

| | | |
|---|---|---|
| 2,546,238 | Richards | Mar. 27, 1951 |
| 2,560,741 | Provost | July 17, 1951 |
| 2,601,256 | Bruson | June 24, 1952 |
| 2,709,163 | Couper et al. | May 24, 1955 |
| 2,837,500 | Andes et al. | June 3, 1958 |
| 2,837,501 | Millhiser | June 3, 1958 |
| 2,917,477 | Suen et al. | Dec. 15, 1959 |
| 2,974,123 | Ketterer | Mar. 7, 1961 |
| 2,983,712 | Wilkinson | May 19, 1961 |
| 2,984,648 | Williams et al. | May 16, 1961 |
| 3,020,265 | Tietz | Feb. 6, 1962 |

FOREIGN PATENTS

| | | |
|---|---|---|
| 1,395 | Japan | Feb. 27, 1958 |

OTHER REFERENCES

The Modern Chelating Agent, Technical Bulletin No. 1, Bersworth Chemical Co., Mass., 1949, page 2 relied on.

Embree et al.: Industrial and Engineering Chem. 43, No. 11, November 51.

Bellmeyer: Textbook of Polymer Chemistry, published by Interscience Publishers Inc. (1957), pp. 254–5.